United States Patent Office.

IMPROVED MEDICAL COMPOUND.

BARCLAY SAMSON, OF CORTLANDVILLE, NEW YORK.

Letters Patent No. 59,750, dated November 20, 1866.

SPECIFICATION.

TO ALL WHOM IT MAY CONCERN:

Be it known that I, BARCLAY SAMSON, of Cortlandville, in the county of Cortland, and State of New York, have invented a new and useful medical compound, called "Samson's Compound or Liver Invigorator," to be used as a tonic generally and for certain special diseases.

To enable others skilled in the art to make and use my invention, I will proceed to describe the ingredients of which it is composed, their proportions, and the manner of its preparation:

Take ¼lb rad. gentian, 1lb rad. mandrake, ¼lb rad. colombo, ½lb rad. calamus, ¼lb camilla or Winters bark, ½lb orange peel, ½lb quassia, 1lb annise seed, 1lb septandra virginica, 2lb sarsaparilla root, 1lb waahoo bark, ¼lb soda, 1 gallon molasses, 2 gallons alcohol reduced one half, these ingredients to be ground and mixed and percolated, and sufficient pure water added to the extract to increase its bulk to ten gallons. The preparation is then ready for immediate use.

What I claim, and desire to secure by Letters Patent, is—

A preparation or compound composed of the ingredients above specified and compounded substantially in the proportions and manner set forth.

BARCLAY SAMSON.

Witnesses:
CHAS. FOSTER,
J. H. PALMER.